US009675828B1

(12) United States Patent
Sery

(10) Patent No.: US 9,675,828 B1
(45) Date of Patent: Jun. 13, 2017

(54) METHODS AND COMPOSITIONS FOR PRODUCING FOAM

(71) Applicant: Matthew James Sery, Clarksboro, NJ (US)

(72) Inventor: Matthew James Sery, Clarksboro, NJ (US)

(73) Assignee: AF3—American Firefighting Foam, LLC, Clarksboro, NJ (US)

( * ) Notice: Subject to any disclaimer, the term of this patent is extended or adjusted under 35 U.S.C. 154(b) by 48 days.

(21) Appl. No.: 13/803,879

(22) Filed: Mar. 14, 2013

Related U.S. Application Data

(60) Provisional application No. 61/614,991, filed on Mar. 23, 2012.

(51) Int. Cl.
*A62C 2/00* (2006.01)
*A62D 1/02* (2006.01)
*C08L 5/00* (2006.01)

(52) U.S. Cl.
CPC .............. *A62D 1/0071* (2013.01); *A62C 2/00* (2013.01); *C08L 5/00* (2013.01)

(58) Field of Classification Search
None
See application file for complete search history.

(56) References Cited

U.S. PATENT DOCUMENTS

| | | | |
|---|---|---|---|
| 4,041,234 A | 8/1977 | Maske | |
| 4,357,260 A | 11/1982 | Sandford et al. | |
| 4,654,086 A | 3/1987 | Baird et al. | |
| 4,950,748 A | 8/1990 | Farrar et al. | |
| 5,270,459 A | 12/1993 | Shatzman et al. | |
| 5,296,164 A | 3/1994 | Thach et al. | |
| 5,434,192 A | 7/1995 | Thach et al. | |
| 5,882,541 A | 3/1999 | Achtmann | |
| 6,262,128 B1 | 7/2001 | Stern et al. | |
| 6,527,970 B1 | 3/2003 | Scogin et al. | |
| 6,740,250 B2 | 5/2004 | Greiner et al. | |
| 6,818,597 B2 * | 11/2004 | Harris | ........................... 507/136 |
| 7,005,082 B2 | 2/2006 | Clark | |
| 7,172,709 B2 | 2/2007 | Clark | |
| 2002/0173553 A1 | 11/2002 | Chen et al. | |
| 2003/0001129 A1 | 1/2003 | Hubert et al. | |
| 2009/0208603 A1 | 8/2009 | Nieto | |

OTHER PUBLICATIONS

Sereno et al., "Impact of the Extrusion Process on Xanthan Gum Behavior", Carbohydrate Research, 2007, 342(10), 1333-1342.

* cited by examiner

*Primary Examiner* — Necholus Ogden, Jr.
(74) *Attorney, Agent, or Firm* — Baker & Hostetler LLP

(57) ABSTRACT

Provided are novel compositions for producing foam comprising a water-soluble polymer that is capable of self-hydrating. The present invention is also directed to methods for producing foam from compositions comprising a water-soluble polymer that is capable of self-hydrating.

24 Claims, 9 Drawing Sheets

METHODS AND COMPOSITIONS FOR PRODUCING FOAM

CROSS REFERENCE TO RELATED APPLICATIONS

This application claims the benefit of U.S. provisional application Ser. No. 61/614,991, filed Mar. 23, 2012, which is incorporated by reference herein in its entirety. This application is not to be published under 35 U.S.C. 122(b), as per the Non-publication Request in the ADS pursuant to 37 C.F.R. §1.213.

TECHNICAL FIELD

The present invention relates generally to compositions and methods for producing a stable foam for firefighting and other applications that does not require the use of fluorosurfactants.

BACKGROUND

Foam materials have a wide variety of applications including fire-fighting, vapor suppression, and crop insulation, among others, and are commercially and industrially important. Currently, foaming materials are prepared by diluting a concentrate of a foaming composition and aerating the diluted solution by eduction or otherwise.

One commercially important class of foams includes aqueous film forming foams (AFFFs). Commercially available AFFF agents typically contain one or more fluorochemical surfactants, non-fluorinated surfactants, thickening agents and aqueous or non-aqueous solvent. The surfactants decrease the surface tension of the foam, increasing the spontaneous spreading of the aqueous film over the surface of non-polar solvents, and contribute to the bubble structure of the foam. The fluorosurfactants extinguish hydrocarbon fires by spreading a thin film over the surface of the fuel. AFFF products, like those used in firefighting, can attain long foam duration by incorporation of a thickening agent or polymer, such as xanthan gum, in the foam concentrate. Thickening agents are used to increase the viscosity and stability of the foam. The incorporation of a polymer into the foam helps retain water in the bubble structure, thereby increasing the drain time and stability of the foam. AFFF products frequently also contain hydrocarbon-based surfactants and are effective in covering the surface of and extinguishing hydrocarbon based fires.

A second commercially important class of foams includes alcohol-resistant aqueous film forming foams (AR-AFFFs). AR-AFFFs also typically contain one or more fluorochemical surfactants, non-fluorinated surfactants, and thickening agents but are designed to also extinguish alcohol and other water-soluble solvent fires by precipitating an alcohol-insoluble polymer, such as xanthan gum, on the surface of the fuel. When the polymer, which is dissolved in the foam solution, contacts a polar solvent, it comes out of solution, forming a cohesive membrane across the surface of the fuel, and extinguishes the fire. Additional foam application cools the membrane and contributes to further sealing of the fuel.

Many of the components typically included in a foam composition concentrate present drawbacks, however. Fluorochemical surfactants are known toxicants and are extremely difficult to remove from the environment. There is a need in the art for stable AFFF and AR-AFFF that do not rely on the use of fluorochemical surfactants. Polymer thickening agents can be difficult to hydrate without clumping; high shear mixing is usually required to sufficiently disperse the polymer particles so that each polymer particle can be fully hydrated. High shear mixing is a time consuming and industrial process, however, resulting in the current state of the art of foam compositions being sold in concentrate form that have been prepared utilizing high shear mixing conditions. The concentrate foam composition can be used to produce a foam either by mixing with water and entraining with air or educting directly through a water stream with the resultant foam either being short or long lived depending on the retention of water in the bubble structure. The use of a concentrate limits the amount of polymer that can be incorporated into the foam composition because beyond a certain amount of polymer the foam composition will become too viscous to be educted or easily diluted to form the foam solution.

The maximum level of polymer in a typical foam concentrate is approximately 1.5 weight percent (15 g/L) polymer to foam concentrate. At concentrations greater than 1.5 weight percent the polymer gels, causing mixing and educting problems that render the product unusable. The resulting use-concentration of a firefighting foam is 3 weight percent of foam concentrate mixed in water for an AR-AFFF 3×3 (3 weight percent for hydrocarbon fires, 3 weight percent for alcohol type fires) or 6 weight percent for an AR-AFFF 3×6 (3 weight percent for hydrocarbon fires, 6 weight percent for alcohol type fires). This produces a foam that is limited in stability by this maximum level of polymer attainable from a concentrate. A standard commercially available AR-AFFF 3×3 with the maximum 1.5 weight percent polymer level, diluted to the standard 3 weight percent, generally can only attain a maximum of 0.45 g/L polymer in the diluted mixed foam solution. There is a need in the art for polymer solutions and foam compositions that allow a sufficient amount of polysaccharide to be incorporated into the foam without requiring high shear mixing.

SUMMARY

The invention relates to a polymer composition for producing a foam, comprising a water-soluble polymer and a non-aqueous solvent, the water-soluble polymer being capable of self-hydrating. In one embodiment, the invention relates to a polymer composition for producing a foam, comprising about 75% to less than about 100% by weight of a water-soluble polymer, the water soluble polymer being capable of self-hydrating; and from greater than about 0% to about 25% by weight of a non-aqueous solvent (weight percentage of water-soluble polymer and non-aqueous solvent in a polymer composition is based on the total weight of water-soluble polymer and non-aqueous solvent). In another embodiment, a polymer solution for producing a foam is provided that comprises up to approximately 1.5% water-soluble polymer in water, the water-soluble polymer being capable of self-hydrating and the polymer solution being capable of being stored for greater than one year or more, during which time the polymer solution is capable of forming a foam when mixed with or educted with a surfactant solution.

Other embodiments include a method of producing a foam composition comprising adding a polymer composition comprising a water-soluble polymer and, optionally, a non-aqueous solvent to water to form a polymer solution having a water-soluble polymer concentration of up to about 1.5%, and combining said polymer solution with foaming agents to produce a foam. Additional embodiments include a firefighting kit comprising a container comprising a polymer composition of the invention and a separate container comprising foaming agents. Other methods, including those to extinguish a fire, provide a barrier for landfill, and provide freeze protection for crops are also contemplated.

One aspect of the invention provides a composition for producing a foam that does not require mixing of the solution to fully hydrate the polymer in the composition. In other embodiments there is minimal mixing required, such as recirculation in a tank, light low energy stirring, or inversion of the container containing the solution. A further aspect of the invention provides a composition for producing foam that contains a high weight percentage of water-soluble polymer.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings.

DETAILED DESCRIPTION OF ILLUSTRATIVE EMBODIMENTS

Figure 1:
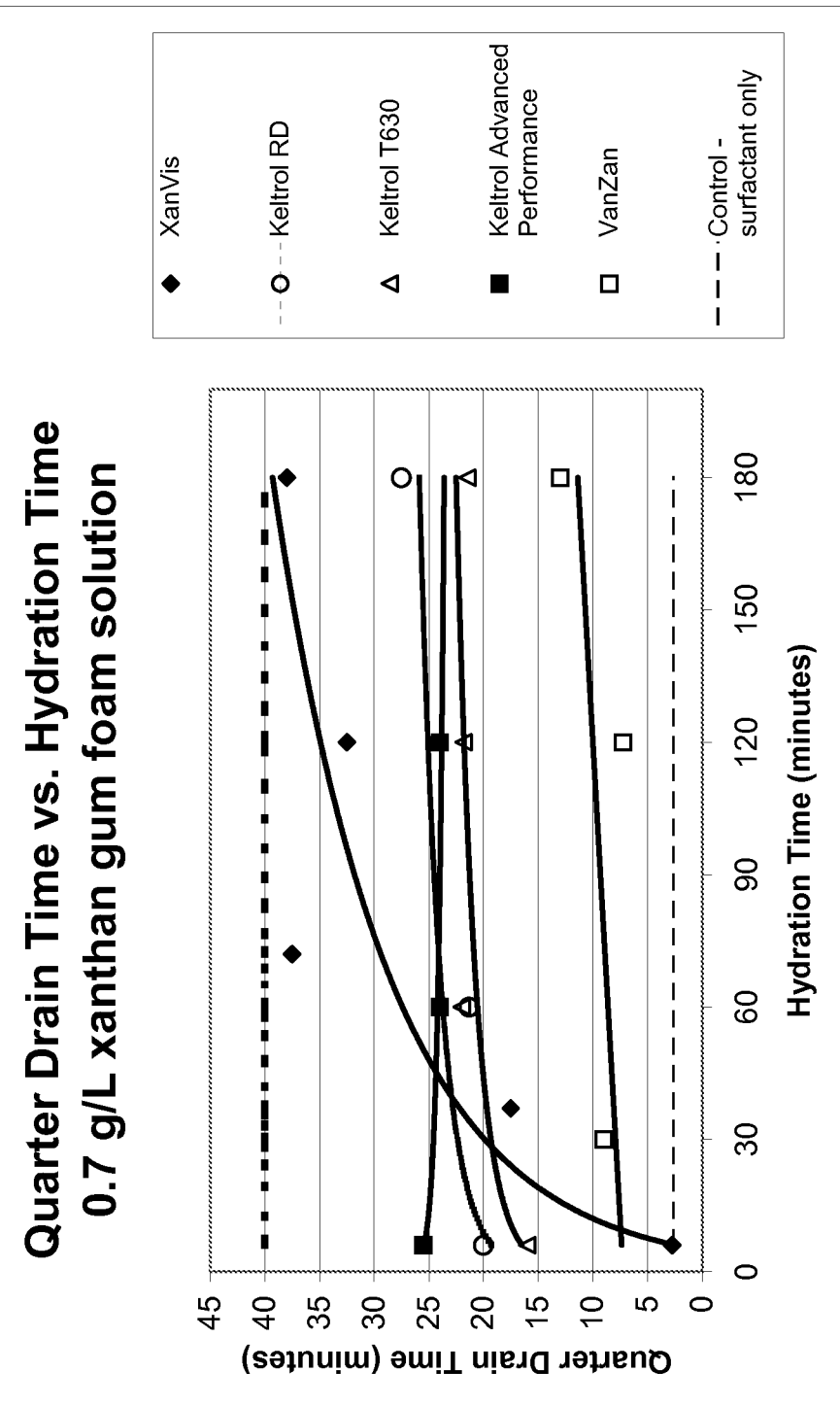
FIG. 1 illustrates the increase in quarter drain time as the hydration time is increased for certain polymer foam solutions.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range. Any and all documents cited in this application are incorporated herein by reference in their entireties.

The present invention provides polymer compositions comprising a water-soluble polymer that is useful for extinguishing fire or for producing foam. In some embodiments, the polymer composition comprises 100% water-soluble polymer and can be applied directly to a fire for the purpose of extinguishing the fire. In other embodiments the polymer composition comprises a water-soluble polymer and a non-aqueous solvent and is useful for producing a foam. The polymer compositions for producing a foam may comprise water-soluble polymer and non-aqueous solvent in any proportion, including compositions comprising from greater than about 0% to less than about 75% by weight of a water-soluble polymer and from about 25% by weight to less than about 100% by weight of a non-aqueous solvent (weight percentage of water-soluble polymer and non-aqueous solvent in a polymer composition is based on the total weight of water-soluble polymer and non-aqueous solvent). In other embodiments, the polymer compositions for producing a foam comprise from about 75% to less than about 100% by weight of a water-soluble polymer and from greater than about 0% to about 25% by weight of a non-aqueous solvent. In certain embodiments, the compositions for producing foam comprise greater than about 80% by weight of water-soluble polymer and up to about 20% by weight of non-aqueous solvent. In certain other embodiments, the compositions for producing foam comprise greater than about 90% by weight of water-soluble polymer and up to about 10% by weight of non-aqueous solvent.

As used herein "water-soluble polymer" is any foam stabilizing polymer that is soluble in water and is preferably one or more of xanthan gum, guar, hydroxyalkyl guar, carboxyalkyl guar, carboxyalkyl hydroxyalkyl guar, cationic guar, hydrophobically modified guar, hydrophobically modified hydroxyalkyl guar, hydrophobically modified carboxyalkyl guar, hydrophobically modified carboxyalkyl hydroxyalkyl guar, hydrophobically modified cationic guar, pectin, alginates, locust bean gum, gum arabic, gum acacia, carrageenan, hydroxyalkyl cellulose, carboxyalkyl hydroxyalkyl cellulose, carboxyalkyl cellulose, alkyl ethers of cellulose, hydroxyalkyl methyl cellulose, hydrophobically modified hydroxyalkyl cellulose, hydrophobically modified carboxyalkyl hydroxyalkyl cellulose, hydrophobically modified carboxyalkyl cellulose, hydrophobically modified alkyl ethers of cellulose, hydrophobically modified hydroxyalkyl methyl cellulose, starch, gum tragacanth, gum karaya, tara gum, xanthan gum, welan gum, succinoglucans, polyvinyl alcohol, polyacrylates, and polyacrylamides. In certain embodiments, the water-soluble polymer is xanthan gum.

As used herein, "non-aqueous solvent" may be any non-aqueous solvent that enhances self-dispersion of the water-soluble polymer in an aqueous solution. Preferably, the non-aqueous solvent is an alkylene glycol, polyalkylene glycol, alkylene or polyalkylene glycol ether, or combinations thereof. The term alkylene glycol includes, but is not limited to: ethylene glycol, diethylene glycol, triethylene glycol, tetraethylene glycol, propylene glycol, trimethylene glycol, dipropylene glycol, glycerin, 2-methyl-1,3-propanediol, 1,4-butanediol, 2,3-butanediol, 2,2-dimethyl-1,3-propanediol, 2,4-pentanediol, 2,5-hexanediol, and combinations thereof; the polyalkylene glycols are selected from the group consisting of but not limited to polyethylene glycols, polypropylene glycols, polyethylenepropylene glycol copolymers, and combinations thereof; the alkylene or polyalkylene glycol mono ethers are selected from the group consisting of but not limited to ethylene glycol methyl ether, ethylene glycol ethyl ether, ethylene glycol butyl ether, diethylene glycol ethyl ether, diethylene glycol methyl ether, diethylene glycol butyl ether, dipropylene glycol methyl ether, tripropylene glycol methyl ether, and combinations thereof.

Polymer compositions of the invention include compositions comprising a water-soluble polymer that is self-hydrating. Examples of self-hydrating polymers include, but are not limited to, XanVis and KelZan XCD (both available from Kelco Oil Field Group, Houston, Tex.). As used herein, "self-hydrating" means that the polymer unfolds and becomes substantially dissolved and surrounded by water molecules, without mixing or with minimal recirculation. As used herein, a "static hydration period" refers to a period of time during which the water-soluble polymer hydrates in solution without mixing or with minimal recirculation. Whether a polymer is self-hydrating can be measured in several ways. A polymer is considered self-hydrating, as the term is used herein, if the polymer, after 60 minutes of static hydration in water at a concentration of 0.7 g/L, results in a solution that, together with a surfactant/foamer, makes a foam having a quarter drain time of greater than 30 minutes in some embodiments, or greater than 35 minutes in other embodiments. A polymer is also considered self-hydrating if, after 60 minutes of static hydration in water at a concentration of 2.0 g/L, the resulting solution, together with a surfactant/foamer, makes a foam having a quarter drain time of greater than 60 minutes in some embodiments, or greater than 80 minutes in other embodiments, or greater than 100 minutes in still other embodiments. The surfactant/foamer may be from about 2.5 g/L to 4.0 g/L. For example, in certain embodiments, the surfactant/foamer is 4.0 g/L actives of sodium decyl sulfate, and in other embodiments may be 2.6 g/L actives of sodium decyl sulfate and 0.3 g/L of dipropyleneglycol methy ether (DPM). Quarter drain time is a measure of foam life conducted by measuring the retention of water in the bubble structure of the foam. The quarter drain time is the time it takes for 25% of the foam solution to drain from the foam structure. The maximum quarter drain time of a composition of foam having a particular concentration of polymer, therefore, corresponds to the foam composition having the longest foam life.

Whether a polymer is "self-hydrating" can also be determined by measuring the increase in viscosity of the solution over time. As the polymer hydrates, the viscosity of the solution increases. A polymer is considered "self-hydrating" if at a concentration of 0.7 g/L in water and in less than 80 minutes of a static hydration period, the polymer solution reaches 75-100% of its maximum viscosity, 80-100% of its maximum viscosity, or 90-100% of its maximum viscosity. A polymer is also considered "self-hydrating" if at a concentration of 2 g/L in water and in less than 120 minutes of a static hydration period, the polymer solution reaches 75-100% of its maximum viscosity, 80-100% of its maximum viscosity, or 90-100% of its maximum viscosity. As a frame of reference, maximum viscosity can be determined by testing the viscosity of a solution of the same formulation after 1-2 hours of high shear mixing. High shear mixing disperses an immiscible solid into a liquid phase by rotating a special impeller which moves different areas of the liquid at different relative velocities. This creates shear forces in the liquid. In some instances, the viscosity of the unmixed polymer solution reaches and exceeds the maximum viscosity. After a sufficient static hydration period, the viscosity of the unmixed polymer solution (subjected to a static hydration period only) decreases, slowly approaching the viscosity of the high shear mixed solution as the hydrated xanthan molecules separate. The maximum viscosity of the polymer solution is this point of convergence where the viscosity of the unmixed polymer solution first reaches or later approaches the viscosity of the polymer solution subjected to high shear mixing.

Polymer compositions of the invention include compositions comprising water-soluble polymer that is readily dispersible. In general, polymers that have the characteristic of being readily dispersible are more likely to be self-hydrating, though not all readily dispersible polymers are self-hydrating as defined herein. As used herein, "readily dispersible" means the polymer will mix with water more readily than a water-soluble polymer that is not readily dispersible. A readily dispersible polymer may require additional shear mixing or stirring for up to about two hours to fully hydrate, as described, for example, in U.S. Pat. No. 5,270,459.

One method of making a self-dispersing polymer is to "surface treat" a polymer that is not self-dispersing. Surface treatment of a polymer delays hydration long enough to disperse the individual granules of polymer in the water before the granules begin to hydrate. This keeps the polymer from forming clumps which prevent water from hydrating the middle of the clump of polymer. Methods of surface treatment of polymers are described, for example, in U.S. Pat. No. 4,041,234, U.S. Pat. No. 4,654,086, and U.S. Published Application 2002/0173553. U.S. Pat. No. 4,041,234 describes the production of dispersible xanthan by adding glyoxal during the fermentation process of the xanthan production. Other methods involve milling, mixing or coating the surface of the polymer with glyoxal, silica, proteins, emulsifiers, dispersants or surfactants and the like. Moreover, some methods of obtaining readily-dispersible polymers utilize changes in solution pH to delay hydration until all of the particles are dispersed. Once in solution, increasing the pH enables the polymer to fully hydrate or more quickly hydrate. In preferred embodiments, the water-soluble polymer has been surface treated such that the polymer disperses best at pH 3-6, while it hydrates fastest at pH 8-10.

The present invention also provides a polymer solution for producing foam. Polymer solutions of the invention comprise water-soluble polymer, optionally a non-aqueous solvent, and water. Polymer solutions of the invention can have a concentration of up to 1.5 weight percent water-soluble polymer in the total solution. More preferably, the polymer solutions of the invention have a concentration of between 0.1 and 0.4 weight percent of water-soluble polymer. The invention provides for polymer solutions wherein the polymer solution comprises a water-soluble polymer that is capable of self-hydrating. The self-hydrating characteristic of the polymer in the polymer solution imparts distinct advantages to the invention. For example, use of a self-hydrating polymer allows the solution to be made at the location where the foam product is needed rather than requiring high shear mixing and the equipment at a manufacturing facility necessary to perform the mixing. The polymer composition may be added directly to water to form the polymer solution. Water may include pure water, deionized or distilled water, tap or fresh water, brackish water, sea water, brine, or other aqueous solutions. In some embodiments the polymer solution formed is a concentrate that may be further diluted before being used in a method for producing a foam composition. A concentrate is any foam producing composition comprising a water-soluble polymer, with or without surfactants or other foaming agents, that must first be diluted before being made into foam. Concentrates of the invention comprise water-soluble polymer and water. Other concentrates of the invention comprise water-soluble polymer, water, and one or more foaming agents. A concentrate can include polymer solutions having a concentration of polymer in solution of greater than about 5 g/L. In other embodiments, of the invention the polymer composition is added directly to a water supply to form a polymer solution that can be used to produce a foam composition without further dilution.

In addition to ease of use, making the solution at the location of the application of the foam allows for a polymer solution having a higher concentration of polymer. The polymer solution is capable of being stored for greater than six months, greater than one year, and/or greater than eighteen months, during which time the polymer solution is capable of forming a foam. Long term aging tests showed that the polymer solution maintained similar performance characteristics after being stored over 18 months outdoors under freeze-thaw conditions with no biocide added (see table 5). Use of a biocide in the formulation will increase the shelf life even further.

The polymer compositions and/or polymer solutions of the invention may also contain one or more of the following optional ingredients: anti-freeze agents, acids, bases, buffers, surfactants, dispersing aids, foaming or antifoaming agents, scale and/or corrosion inhibitors, polymer preservatives, bactericides, antioxidants, water miscible co-solvents, formation clay stabilizers, crosslinkers, polymer and gel breakers, and other materials that aid the foam producing composition in performing its intended application and that are well-known by those of ordinary skill in the art of formulating compositions for producing foam. Anti-freeze agents include, but are not limited to, glycerine, ethylene glycol, diethylene glycol, polyethylene glycol, propylene glycol, dipropylene glycol methyl ether, tripropylene glycol methyl ether, as well as salts and other solids which reduce the freezing point such as calcium, magnesium, potassium, sodium and ammonium chloride and urea. Buffers include, but are not limited to, Sorensen's phosphate or McIlvaine's citrate buffers. Corrosion inhibitors include, but are not limited to toluyl triazole, and many phosphate ester acids. Additional and exemplary optional ingredients are disclosed in U.S. Pat. No. 7,005,082, which is incorporated herein by reference.

Polymer compositions and/or polymer solutions of the invention can optionally include dispersion agents. More efficient dispersion of a self-hydrating polymer into water can be achieved with the addition of a number of dispersing aids. Dispersing aids help keep the individual granules of polymer separated as they contact the water, thereby allowing time for the particles to disperse before hydrating. The dissolving effect of certain dispersing aids can also act dynamically in separating wetted granules. Dispersing aids include, but are not limited to, sodium hexametaphosphate, sodium citrate, citric acid, sodium bicarbonate, sodium carbonate, magnesium sulfate, sodium sulfate and sugar. They can be effective in a powder blend with dry polymer or blended with the solvent-wetted polymer. A formulation which contains an effervescent dispersing aid such as an acid in combination with a carbonate, for instance citric acid or tartaric acid with sodium bicarbonate or sodium glycine carbonate and the like, provides dynamic dispersion for better distribution in a large tank. With the space constraints evident in the small filling ports of fire trucks, this helps transport the material into the water more quickly and efficiently. When citric acid and sodium bicarbonate are used, the ratio is 1 mole of citric acid to 3 moles of sodium bicarbonate, variable with an excess of acid or carbonate based on the pH desired.

The term "foaming agents" includes surfactants, and may optionally also include solvents, corrosion inhibitors, or biocides and other foam aids. These agents include but are not limited to those disclosed in U.S. Pat. No. 7,005,082, which is incorporated herein by reference. The term "foaming agents" also includes commercially available foam composition concentrates. Commercially available foam composition concentrates can be a combination of any of anionic, cationic, nonionic and/or amphoteric hydrocarbon surfactants and, optionally, may further include various solvents, polymers, corrosion inhibitors, sequestering agents, salts, biocides or other agents formulated for dilution with water to specified concentrations to produce foam of varying expansion and stability. Examples of commercially available foam composition concentrates include Class A foams (KnockDown by National Foam, Inc., CLASS A PLUS by ChemGuard and SILVEX by Ansul), concentrates characterized by Underwriters Laboratory as "wetting agents" (Fire Strike by Biocenter, Inc.; Bio-Fire by Envirorenu Technologies LLC; Enviro-Skin 1% by Environmental Products Inc.; F-500 by Hazard Control Technologies Inc.; Knockdown by National Foam Inc.; Phos-Chek WD881 by Solutia, Inc.; Flameout by Summit Environmental Corp., Inc.; Micro-Blazeout by Verde Environmental Inc.; and Bio-solve by Westford Chemical Corp.), AFFF, AR-AFFF or High Expansion foam concentrates (HI-EX, EXTRA, C2, and VEE-FOAM). Standard Class A foam concentrates are only able to extinguish Class A combustibles (ordinary combustibles), such as wood and other hydrocarbon based combustibles, while Class B foam concentrates are designed only to extinguish Class B fires (flammable liquids), including alcohol (polar solvent/water miscible) based fires. An advantage of the present invention is that the same polymer solution can be used to extinguish either Class A or Class B fires by combining the polymer solution with a Class A foam concentrate or a single surfactant solution such as sodium decyl sulfate.

The polymer solution according to the invention is capable of forming a long lasting foam without the use of flurosurfactants. A polymer solution according to the invention is capable of forming a foam having a quarter drain time greater than 30 minutes where the polymer is present at a concentration of 0.7 g/L using a basic foamer (e.g. 2.5 g/L to 4.0 g/L actives sodium decyl sulfate) and without mixing or with minimal recirculation. A polymer solution according to the invention is also capable of forming a foam having a quarter drain time greater than 96 hours where the polymer is present at a concentration of 5.0 g/L using a certain foam formulation and without mixing or with minimal recirculation (see Example 2). It is possible to create longer lasting foams by varying the formulation (for example, by varying the ratio and types of surfactants and foam stabilizers or by including fluorosurfactants) and/or the foam making device and parameters as well as the polymer concentration.

Polymer solutions described herein combine the advantage of having a high concentration of polymer to create stable, long lasting foam not requiring fluorosurfactants with the advantage of being a polymer solution that does not have to be used immediately, but rather can be stored and applied on different occasions. Certain characteristics of the polymer solutions of the invention make them particularly advantageous for refilling fire extinguishers: the user can make the solution on site (such as at a private residence), as shear mixing is not required, and the polymer solution can be stored in the can until needed. Polymer solutions described herein are also advantageous for preparing foam to prevent crop freeze or to use as a vapor barrier in a landfill, as the polymer solution can be prepared on site and stored for multiple applications. In other embodiments, certain of the polymer solutions are also advantageous for use in vapor suppression of volatile chemicals. Current foam compositions must be re-applied to the volatile chemicals about every 30 minutes, due to the drainage of an AR-AFFF or vapor suppression foam, which typically have a quarter drain time of 10 to 30 minutes. Foams made from the polymer compositions or polymer solutions described herein can have quarter drain times of 96 hours or more, significantly reducing the number of applications of foam composition required. And polymer compositions or polymer solutions described herein may be used to turn many unsuitable foamers into vapor suppression foams as well as Class B AFFFs and AR-AFFFs, so a firefighter doesn't need to determine the physical property of the volatile chemical before deciding which foam product is suitable to apply. Foams made from the polymer compositions or polymer solutions described herein can be applied to any fuel for vapor suppression or any burning Class A or Class B fire, giving firefighters a "one foam fits all" flexibility. A further advantage of the polymer compositions and polymer solutions described herein is that the high concentration of polymer results in a long lasting foam that does not require fluorosurfactants.

The instant invention further provides a method of producing a foam composition comprising adding a polymer composition made of water-soluble polymer and, optionally, a non-aqueous solvent to water, preferably without shear mixing, to form a polymer solution. The polymer solution can subsequently be combined with foaming agents and optionally other ingredients that are useful to making foams and would be readily apparent to persons skilled in the art. Polymer solutions made according to methods of the invention are capable of being stored for greater than one year and can then be combined with foaming agents to produce a foam. In some embodiments the concentration of polymer in the polymer solution is up to about 15 g/L (or 1.5 weight percent). More preferably, the concentration of polymer in the polymer solution is between about 1 g/L to about 5 g/L. The polymer solutions made according to methods of the invention may be made from polymer compositions comprising water-soluble polymer and non-aqueous solvent in any proportion, including compositions comprising from greater than about 0% to less than about 75% by weight of a water-soluble polymer and from about 25% by weight to less than about 100% by weight of a non-aqueous solvent (weight percentage of water-soluble polymer and non-aqueous solvent in a polymer composition is based on the total weight of water-soluble polymer and non-aqueous solvent). In other embodiments, the polymer solutions for producing a foam are made from polymer compositions comprising from about 75% to less than about 100% by weight of a water-soluble polymer and from greater than about 0% to about 25% by weight of a non-aqueous solvent. In certain embodiments, the polymer compositions comprise greater than about 80% by weight of water-soluble polymer and up to about 20% by weight of non-aqueous solvent. In certain other embodiments, the polymer compositions comprise greater than about 90% by weight of water-soluble polymer and up to about 10% by weight of non-aqueous solvent. In other embodiments the polymer composition comprises about 100% polymer.

A traditional Class A foam or an alcohol resistant aqueous film forming foam (AR-AFFF) without fluorine cannot extinguish and/or resist burn back when applied to polar solvent fires. A traditional Class A foam disintegrates when it contacts a polar solvent (burning or not); the water miscibility of the solvent dissolves the water-based foam. An AR-AFFF concentrate has up to 1.5% xanthan gum in its formulation which when diluted to its use concentration of 3% delivers 0.45 g/L of xanthan gum in the foam. Xanthan gum is insoluble in polar solvents so when it contacts the fuel it precipitates out of the foam solution and provides a solid yet permeable membrane that extinguishes the polar solvent fire and provides a surface for new foam to build and advance across the fire or the surface of the non-burning fuel. But the volatile fuel vapors migrate through the xanthan membrane and enter and eventually destroy the bubble structure. This causes the foam to break down and the vapors that were absorbed into the bubble structure can ignite, triggering flash-overs and complete foam disintegration. The fluorine-containing ingredients in an AR-AFFF stabilizes the foam structure and inhibits the fuel vapors from penetrating the bubble walls. The polymer compositions of the present invention that contain no fluorine are able to stabilize the foam by enabling increased levels of foam stabilizing polymer, well above the 0.45 g/L limit of the current art. As a result, in certain embodiments, by combining a polymer solution of the present invention with a simple lone surfactant like sodium decyl sulfate, extinguishment and burnback ability is possible because of the ability to deliver sufficient levels of polymer to the fire. Combining the compositions and solutions of the present invention with formulations that increase foam stability and foam life and/or with commercially available foam products already on the market, increases the performance and uses of the polymer compositions, polymer solutions and methods of the invention and makes its use more convenient and versatile for the firefighter.

In one embodiment of the present invention, the polymer solution is mixed with a simple surfactant solution containing only 2.5 g/L actives alphaolefin sulfonate and sodium octyl sulfate in sea water and has been shown to be capable of extinguishing a modified UL 162 Type II acetone fire at 0.10 gpm/ft$^2$ (Table 5). In another embodiment, 2 g/L of the polymer solution is mixed with a single surfactant, sodium decyl sulfate, at 2.6 g/L actives in fresh water and has been shown to be capable of extinguishing a modified UL 162 Type II 99% isopropyl alcohol fire at 0.16 gpm/ft$^2$ (Table 5). In another embodiment, 2 g/L of the polymer solution is mixed with 2.4 g/L actives sodium lauryl sulfate, at 0.5 g/L actives cocoamidopropyl betain and 0.3 g/L lauryl alcohol in fresh water and has been shown to be capable of extinguishing a modified UL 162 Type II acetone fire at 0.10 gpm/ft$^2$ and a modified UL 162 Type II heptane fire at 0.10 gpm/ft$^2$ (Table 5). In another embodiment, 2 g/L of the polymer solution is mixed with a Class A foam KnockDown at 10 g/L in sea water and has been shown to be capable of extinguishing a modified UL 162 Type II acetone fire at 0.10 gpm/ft$^2$ and a Type II 99% isopropyl alcohol fire at 0.15 gpm/ft$^2$ (Table 5). Therefore, just one foam formulation can be used on every type of fire, Class A, Class B hydrocarbons or Class B polar solvents, without the need for environmentally harmful fluorosurfactants.

A further advantage of polymer compositions and polymer solutions of the invention is that because high polymer concentrations are attainable in the polymer solution and foam composition, fluorosurfactants are not required for the foam producing composition to produce a stable foam. Some polymer solutions of the invention do not contain any fluorosurfactants. In some polymer solutions of the invention, the foaming agent used is a commercially available fluorine-containing AFFF or AR-AFFF and results in increased foam life for better firefighting and burnback resistance.

In accordance with the methods of the invention, the polymer compositions or polymer solutions of the invention can be used as an additive in a firefighting tender truck, tanker/pumper truck, compressed air foam system or mobile tank that normally carries only water. They can also be utilized in a stationary tank in conjunction with firefighting apparatus such as fixed foam discharge system or foam monitors used to protect large volumes of flammable liquids in storage tanks or tank farms. Use of polymer compositions and polymer solutions of the invention is advantageous over existing commercially available foam composition concentrates because they can achieve higher concentrations of polymer in solution without high shear mixing (such higher concentrations include up to about 5 g/L polymer in solution, a 10-fold increase over the current art) and achieve the same or greater firefighting capability without the use of fluorine. Optimum polymer concentration can be determined for maximizing cost effectiveness for the specific application and foam life can be maximized both by varying the formulation of the foaming portion and/or increasing the level of the polymer in the tank. As described, existing commercially available foam composition concentrates generally have a use concentration of 0.45 g/L; 15 g/L polymer concentrate is diluted to 3 weight percent in solution before use, resulting in a polymer concentration of 0.45 g/L in the water tank, at most. The resulting foam formed from the compositions, solutions and methods of the invention has added stability and foam life because of the incorporation of a higher concentration of polymer into the foam. In accordance with the methods of the invention, the non-aqueous composition can be added to the water stream while the water tank is being filled with water or directly to a tank already filled with water. While an advantage of the invention is that mixing or recirculation of the polymer/solvent/water solution is not required, recirculation of the solution can aid in the rate of hydration of the polymer. Further, the polymer solution remaining in the firefighting tender truck can be stored and used on subsequent fires. A single polymer solution in conjunction with a simple environmentally benign surfactant solution or commercially available foam concentrate can be used on Class A or Class B type fires.

The instant invention further provides for a foam composition kit comprising (1) a polymer composition for producing foam, comprising a water-soluble polymer and (2) a separate container comprising foaming agents. The water-soluble polymer is preferably capable of self-hydrating. In some foam kits of the invention, the polymer composition is 100% water-soluble polymer. In other foam kits of the invention, the polymer composition comprises water-soluble polymer and non-aqueous solvent in any proportion. The polymer composition can be a slurry or a wetted powder comprising polymer and non-aqueous solvent. Preferably the foam composition kit comprises (1) a polymer composition for producing foam, comprising about 75% to about 100% by weight of a water-soluble polymer and about 0% to about 25% by weight of a non-aqueous solvent and (2) a separate container comprising foaming agents (weight percentage of water-soluble polymer and non-aqueous solvent in a polymer composition is based on the total weight of water-soluble polymer and non-aqueous solvent). In other embodiments, the polymer composition of the foam kit comprises from about 75% to less than about 100% by weight of a water-soluble polymer and from greater than about 0% to about 25% by weight of a non-aqueous solvent. In certain embodiments, the polymer composition of the foam kit comprises greater than about 80% by weight of water-soluble polymer and up to about 20% by weight of non-aqueous solvent. In certain other embodiments, the polymer composition of the foam kit comprises greater than about 90% by weight of water-soluble polymer and up to about 10% by weight of non-aqueous solvent. In some embodiments of the invention, the polymer solution and foaming agents can be mixed and stored together. In some embodiments of the invention, each component of the kit is contained in a bag made of a water-soluble material, such as polyvinyl alcohol. Foam composition kits of the invention encompass embodiments where the water-soluble polymer is contained in a water-soluble container, said water-soluble container being contained in a second water-soluble container which also contains the non-aqueous solvent. Alternatively, the non-aqueous solvent is contained in a water-soluble container, said water-soluble container being contained in a second water-soluble container which also contains the water-soluble polymer. When the water-soluble container (or series of containers) containing the water-soluble polymer and the non-aqueous solvent is added to water, the water-soluble container dissolves, releasing the contents of the container into the water. The polymer composition may contain water-free foam stabilizers, additives or biocides. The water-soluble container may also contain water-free foam solutions or powder foam ingredients. Foam composition kits of the invention also encompass embodiments where the water-soluble polymer along with non aqueous liquid or powder surfactants, non aqueous solvent, biocides, corrosion inhibitors and the like are stored in a container, either contained in a water-soluble bag or not, for the purpose of adding water to the container to achieve a foam concentrate solution.

The compositions, solutions, methods and kits of the invention are suited to commercial application in a wide range of fields. Preferably, the compositions and methods of the invention are applicable to firefighting. The compositions, solutions, methods and kits of the invention are also useful in environmental applications and agricultural applications. Foams made from compositions, solutions, methods or kits according to the invention can be utilized in the landfill industry to cover a landfill with a layer of foam. Some state regulations require landfills to be covered with a minimum of 6 inches of soil or foam to contain odors, prevent blowing litter and limit the potential for fires. Foam provides a cost effective and space-saving alternative to plowing over with soil since foam provides the required protection and eventually compresses to take up no landfill space. A layer of foam suited for this purpose typically must be able to last for up to 72 hours, be biodegradable, and contain no EPA reportables. Foams made from compositions, solutions, methods or kits of the present invention are particularly suited for use as landfill foam because they are stable over long durations, including at least 72 hours, without requiring use of fluorosurfactants. They also do not have the negative aspects and problems associated with protein hydrolysate foams that are currently used in this industry. Foams made from compositions, solutions, methods or kits of the present invention can also be utilized in the agricultural industry to protect crops from freezing. When cold temperatures threaten to ruin valuable fruit or crops before harvest, compositions, solutions, methods and kits of the present invention can be used on site to deliver a foam that is long lasting, insulating and environmentally safe. In embodiments of the invention most suited for crop freeze protection, the non-aqueous solvent is preferably one or more of propylene glycol, polyethylene glycol, glycerin, or other solvents that are FDA approved for contact with food as well as serve an antifreeze function in the foam producing composition solution. The foam made from compositions, solutions, methods or kits of the invention can also be utilized as a structure protection agent where approaching wildfires threaten homes and buildings. Solutions of the invention can be stored in specially designed mobile extinguishers that are kept onsite by a homeowner (or managed by a fire department or professional agency) and be applied to the house in the event of an impending wildfire. The foam lasts several days, clings to vertical surfaces and provides a protective barrier to burning embers and flames. Foams produced by compositions, solutions, methods, or kits of the invention can also be sprayed along the ground in wildland areas as a fire break that can last for several days. A wildfire barrier formed from the compositions, solutions, methods or kits of the present invention, result in a foam that is environmentally friendly, contains no hazardous ingredients and will not stain surfaces.

EXAMPLES

The following examples, while illustrative individual embodiments, are not intended to limit the scope of the described invention, and the reader should not interpret them in this way.

Example 1. Self-Hydrating Polymer Testing— Three types of xanthan gums were examined. A 0.3% polymer solution was made by adding 0.9 g of a xanthan gum, determined to be self-hydrating, (XanVis available from Kelco Oil Field Group, Houston, Tex.) to 3.5 g Calsolv DPM and 281 g water. After 10 minutes, 97.0 g of this solution was combined with 3.0 g of a surfactant solution containing 4.3 g Calsolv DPM, 0.5 g 1-dodecanol, 10.0 g Stepanol WAT (sodium lauryl sulfate) and 35 g water at 25° C. A foam was generated from the polymer/foam solution by shaking 100 mL of the solution for 15 seconds in a graduated 2000 mL container, inverting the container and measuring the time for 25 mL to drain from the foam. Tests showed that after 10 minutes the XanVis polymer was hydrated sufficiently to provide a Quarter Drain Time (QDT) of 19 hours, which is comparable with QDT times achieved using the same formulation but with first hydrating the XanVis polymer or a standard non-readily-dispersible, non-self-hydrating xanthan gum for 2 hours under high shear mixing (see Table 1).

0.9 g of XanVis was added to 3.5 g Calsolv DPM and 281 g water and mixed under high shear conditions for 2 hours. 97.0 g of this solution was combined with 3.0 g of a surfactant solution containing 4.3 g Calsolv DPM, 0.5 g 1-dodecanol, 10.0 g Stepanol WAT (sodium lauryl sulfate) and 35 g water at 25° C. A foam was generated from the polymer/foam solution by shaking 100 mL of the solution for 15 seconds in a graduated 2000 mL container, inverting the container and measuring the time for 25 mL to drain from the foam. The foam had a QDT of 34 hours.

0.9 g of a standard non-readily-dispersible, non-self-hydrating xanthan gum (VanZan, available from R.T. Vanderbilt, Norwalk, Conn.) was added to 3.5 g Calsolv DPM and 281 g water and mixed under high shear conditions for 2 hours. 97.0 g of this solution was combined with 3.0 g of a surfactant solution containing 4.3 g Calsolv DPM, 0.5 g 1-dodecanol, 10.0 g Stepanol WAT (sodium lauryl sulfate) and 35 g water at 25° C. A foam was generated from the polymer/foam solution by shaking 100 mL of the solution for 15 seconds in a graduated 2000 mL container, inverting the container and measuring the time for 25 mL to drain from the foam. The foam had a QDT of 24 hours.

Universal Gold (available from National Foam, Exton, Pa.), like most conventional xanthan-based AR-AFFF foam concentrates that, due to viscosity limitations, contain close to the maximum amount of polymer that an AR-AFFF foam concentrate can typically hold (approximately 1.5% xanthan gum), was used as the control. Universal Gold was diluted to 3%, resulting in an estimated xanthan concentration of approximately 0.045% (0.45 g/L) before use. The Universal Gold control produced a 20 minute QDT.

TABLE 1

| Polymer | Hydration Time | QDT (hours) | Viscosity (mPa · s) |
| --- | --- | --- | --- |
| XanVis | 10 minutes, static | 19 | — |
| XanVis | 2 hours, high shear stir | 34 | 459 |
| VanXan | 2 hours, high shear stir | 24 | 400 |
| Universal Gold | — | 0.3 | — |

Example 2. Self-Hydrating Polymer Testing—A polymer solution was prepared by combining 50.0 g XanVis, 9895 g water, 51.4 g Calsolv DPM, 3.0 g 1-dodecanol, 60.5 g Stepanol WAT (sodium lauryl sulfate), and 7.3 g Amphosol CA (cocoamidopropyl betaine). The solution was foamed by air aspirating through a nozzle having a 7.5"×⅜" discharge tip at 2 gallons per minute (GPM) and 100 pounds per square inch (psi) pressure. The foam was collected off of a 45 degree angled backboard into a 1.5 L cylindrical collection pot with a valve at the base. The foam formed had an expansion ratio (volume of foam to volume of polymer solution used to form foam) of 4.2 and a quarter drain time of 96 hours.

The same solution was used to create a foam by shaking 100 mL of the solution for 15 seconds in a graduated 2000 mL container, inverting the container and measuring the time for 25 mL to drain from the foam. Expansion ratios were measured by calculating the volume of foam generated and dividing by 100 mL of the original foam solution. The foam had expansion ratio of 3.0 and quarter drain time of 92 hours.

The same solution was used to create a foam by using a commercially available foam making device, the Pro/pak portable foam system, at 10 gpm and 100 psi pressure. The foam formed had an expansion ratio (volume of foam to volume of polymer solution used to form foam) of 3.6 and a quarter drain time of 48 hours.

Example 3. Self-Hydration Polymer Testing (Quarter Drain Time)— Five types of xanthan gums and two controls (surfactant only and Universal Gold) were tested. Each polymer solution tested had a polymer concentration of 0.7 g/L and a surfactant concentration of 4.0 g/L actives sodium decyl sulfate. The surfactant only control was 4.0 g/L actives sodium decyl sulfate. The Universal Gold control was diluted to 4.7% to achieve the approximate equivalent of 0.7 g/L polymer in solution. A foam was formed from each solution by shaking 100 mL of the solution for 15 seconds in a graduated 2000 mL container, inverting the container and measuring the time for 25 mL to drain from the foam. The results from the quarter drain time experiment are summarized in Table 2. FIG. 1 illustrates the increase in quarter drain time as the hydration time is increased for XanVis (available from Kelco Oil Field Group, Houston, Tex.), Keltrol RD, Keltrol T630, and Keltrol Advanced Performance (available from CP Kelco, Okmulgee, Okla.) and VanZan (available from R.T. Vanderbilt, Norwalk, Conn.).

TABLE 2

| | | | | | | Control - | Control - |
| Time | XanVis | Keltrol RD | Keltrol T630 | Keltrol Advanced Performance | VanZan | surfactant only | Universal Gold |
|---|---|---|---|---|---|---|---|
| 0 | | | | | | | |
| 6 | 2.7 | 20.0 | 16.0 | 25.5 | | 2.6 | 40.0 |
| 30 | 17.5 | | | | 9.0 | | |
| 37 | 37.5 | | | | | | |
| 60 | | 21.3 | 22.0 | 24.0 | | | |
| 72 | 32.5 | | | | | | |
| 120 | | | 21.8 | 24.0 | 7.3 | | |
| 180 | 38.0 | 27.5 | 21.5 | | 13.0 | | |

Figure 2:
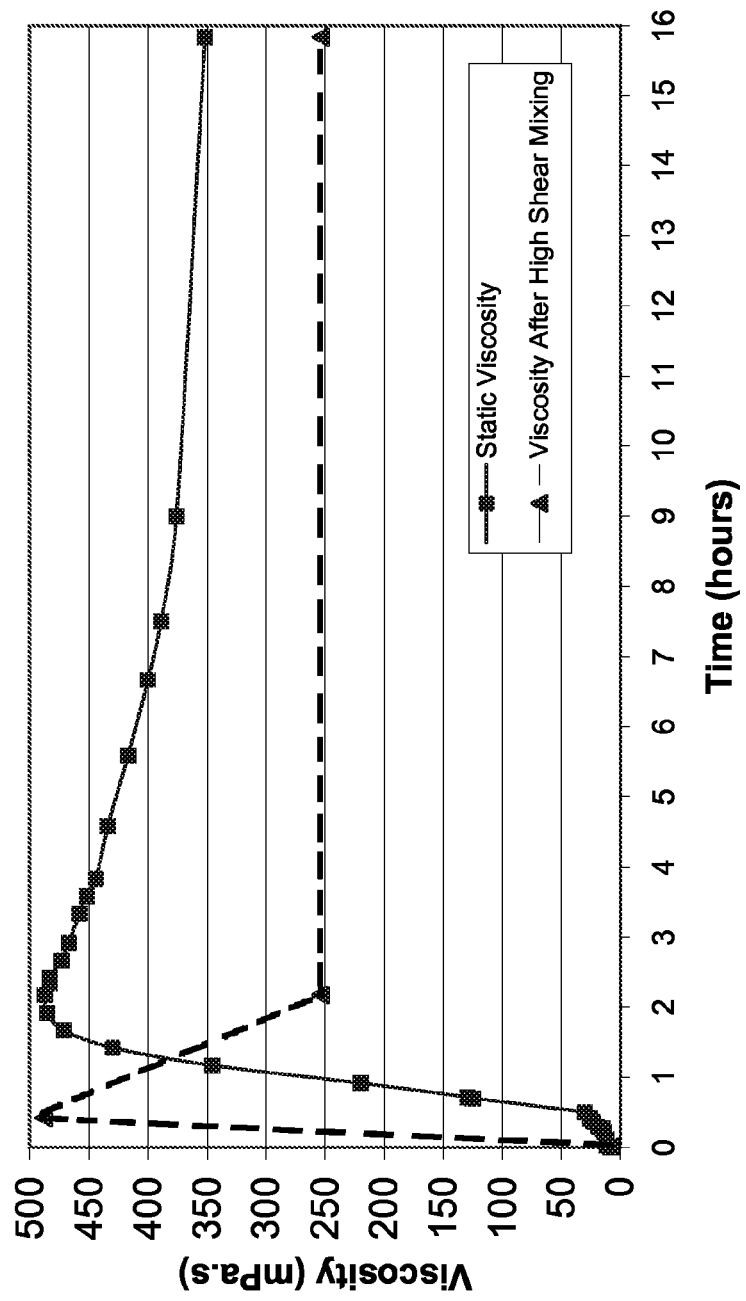
FIGS. 2, 2a, and 2b illustrate the viscosity of certain polymer solutions over time.
Figure 2A:
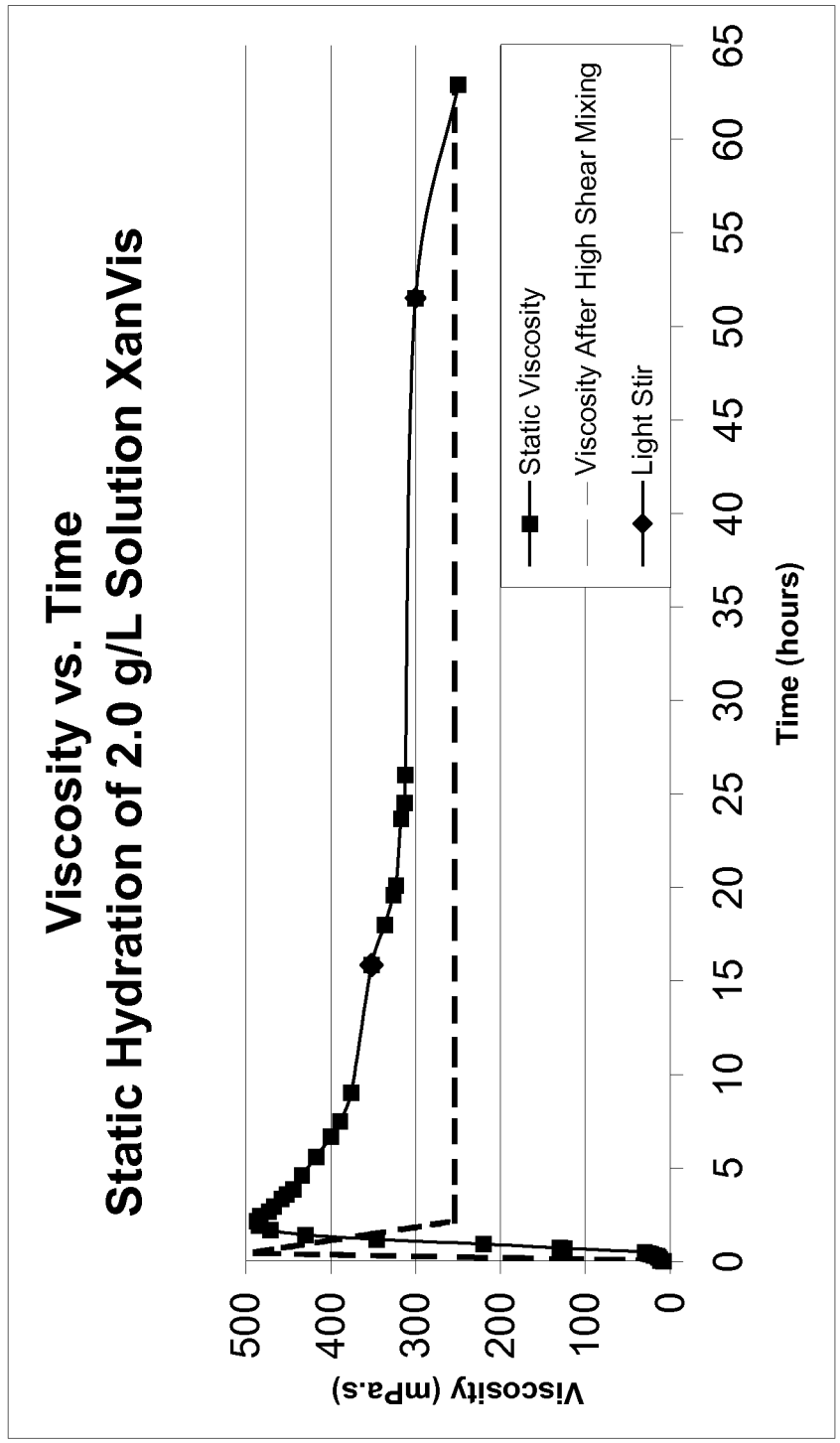
Figure 3:
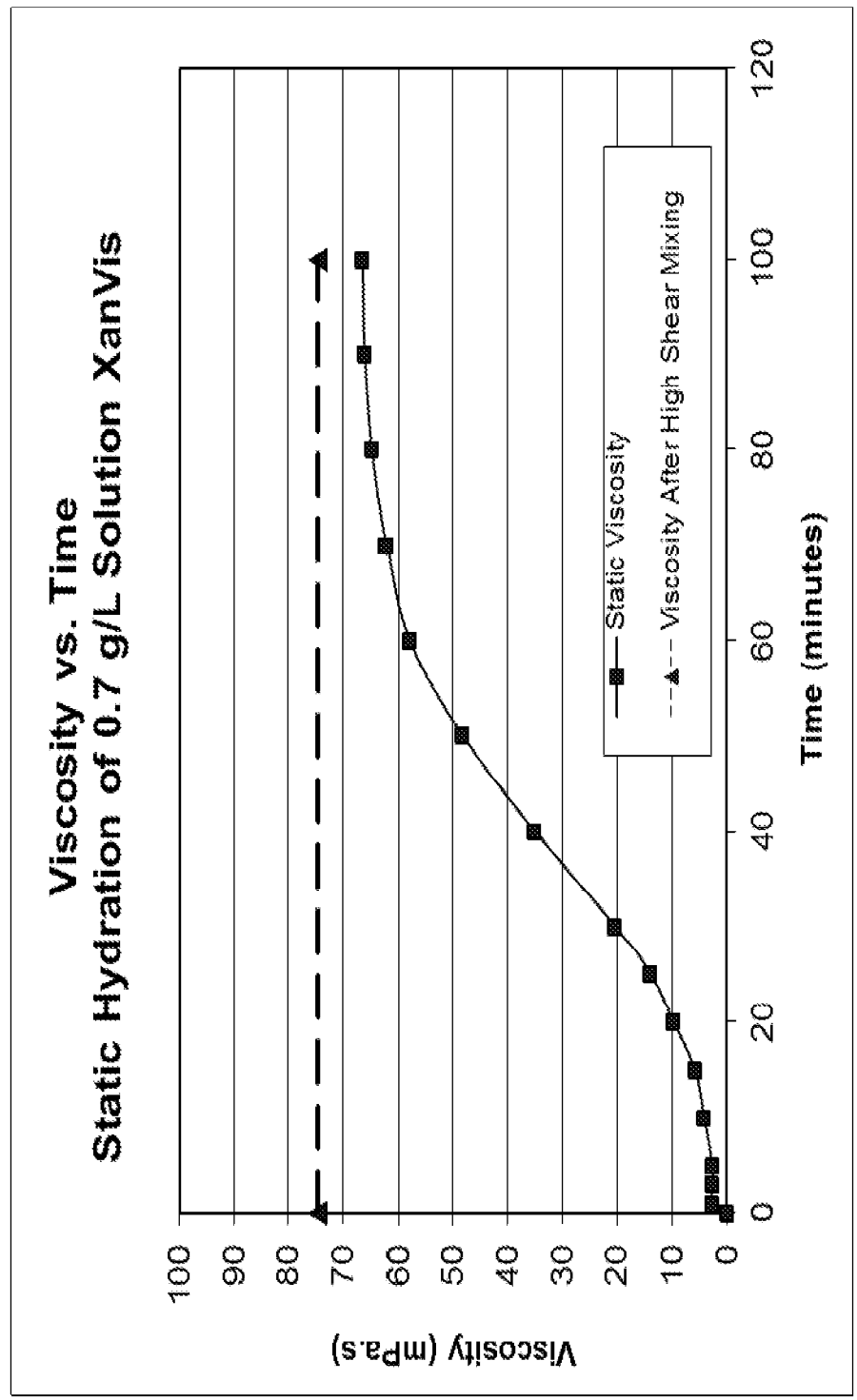
FIG. 3 illustrates the increase in viscosity of a certain polymer solution over time, without stirring.
Figure 4:
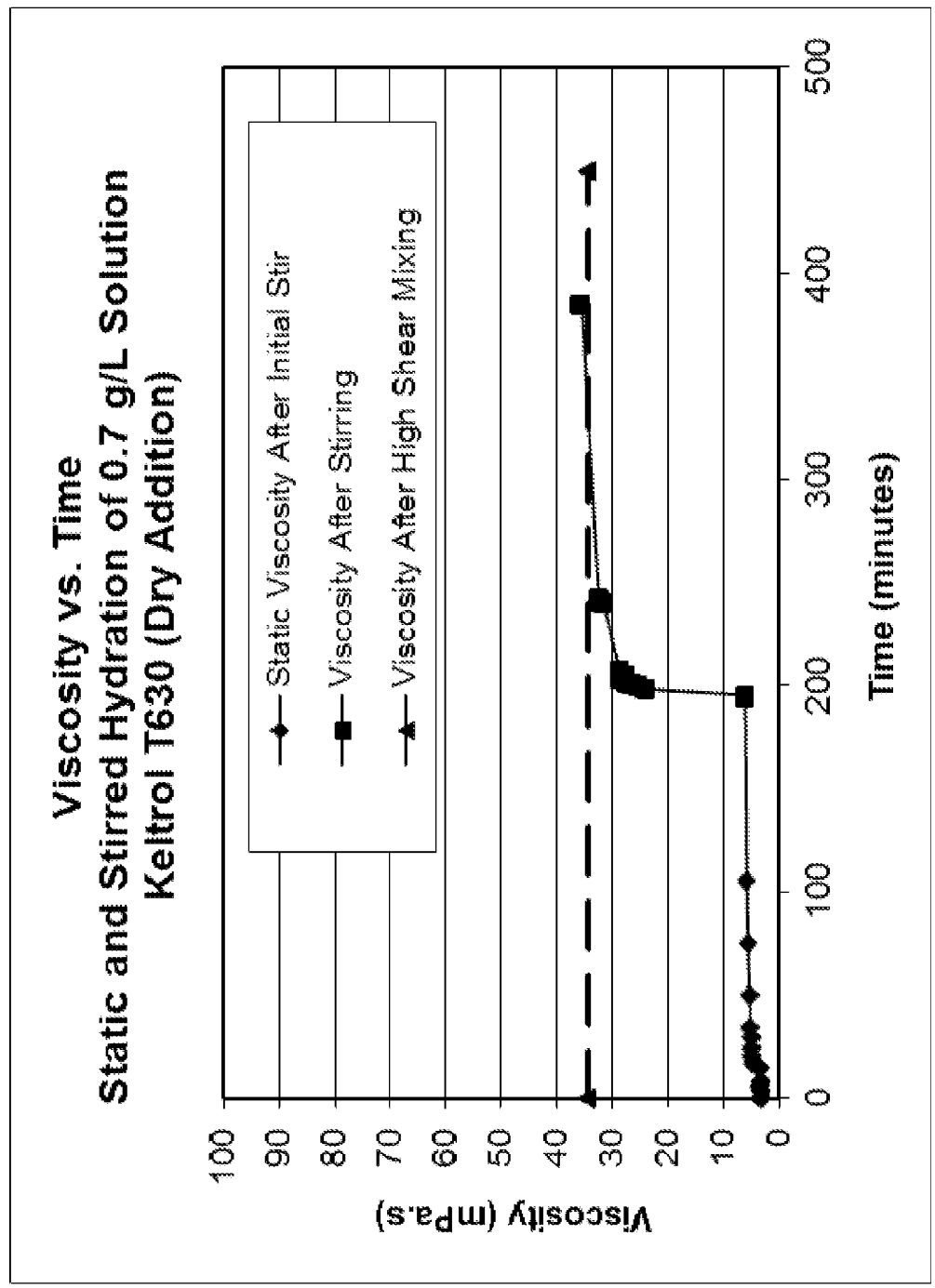
FIG. 4 illustrates the increase in viscosity of a certain polymer solution in water over time, with the solution being stirred at 200 minutes.
Figure 5:
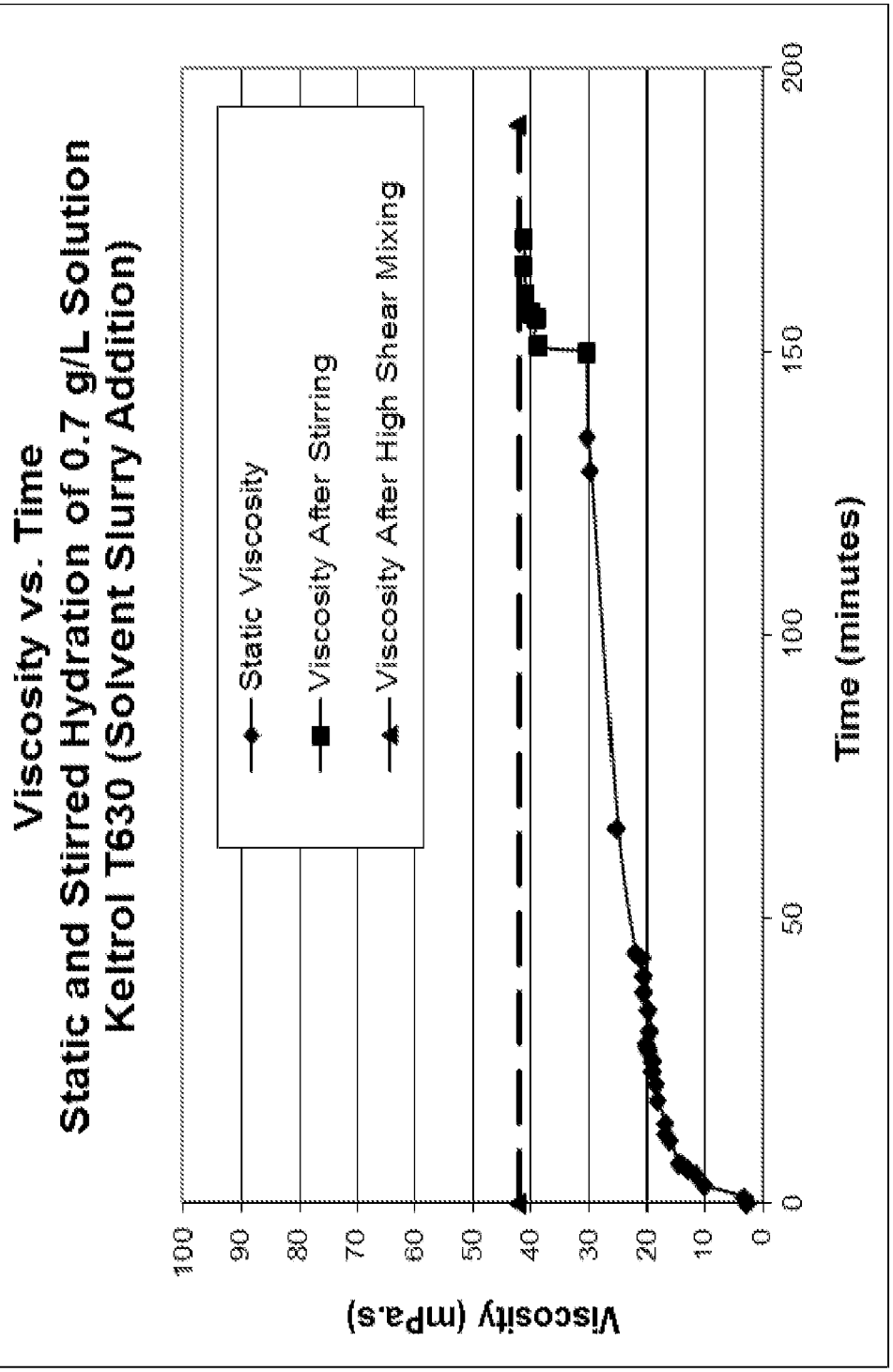
FIG. 5 illustrates the increase in viscosity of a certain polymer solution over time with the solution being stirred at 150 minutes.
Figure 6:
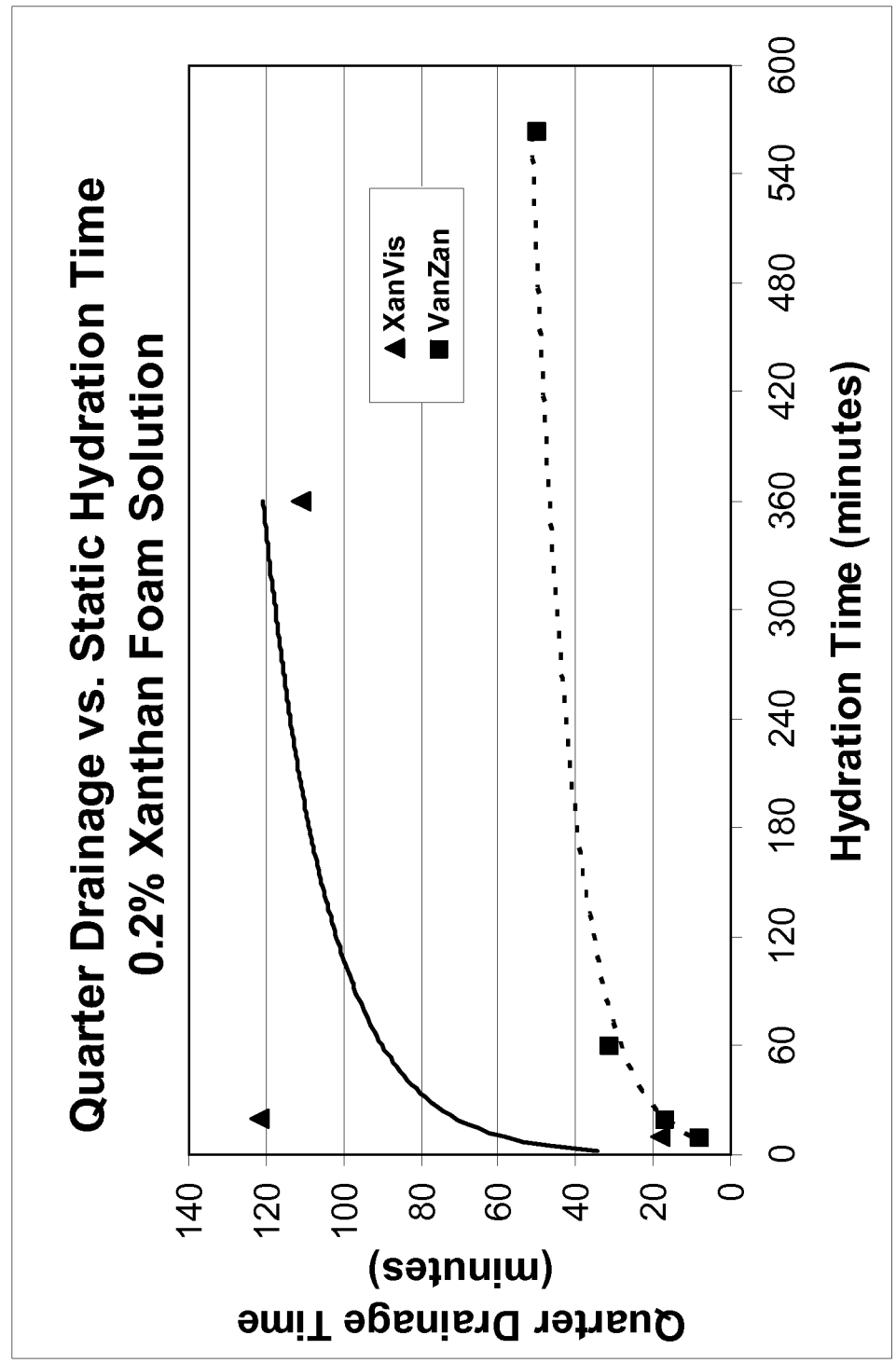
FIG. 6 illustrates the increase in quarter drain time as the static hydration time is increased for certain polymer solutions.
Figure 7:
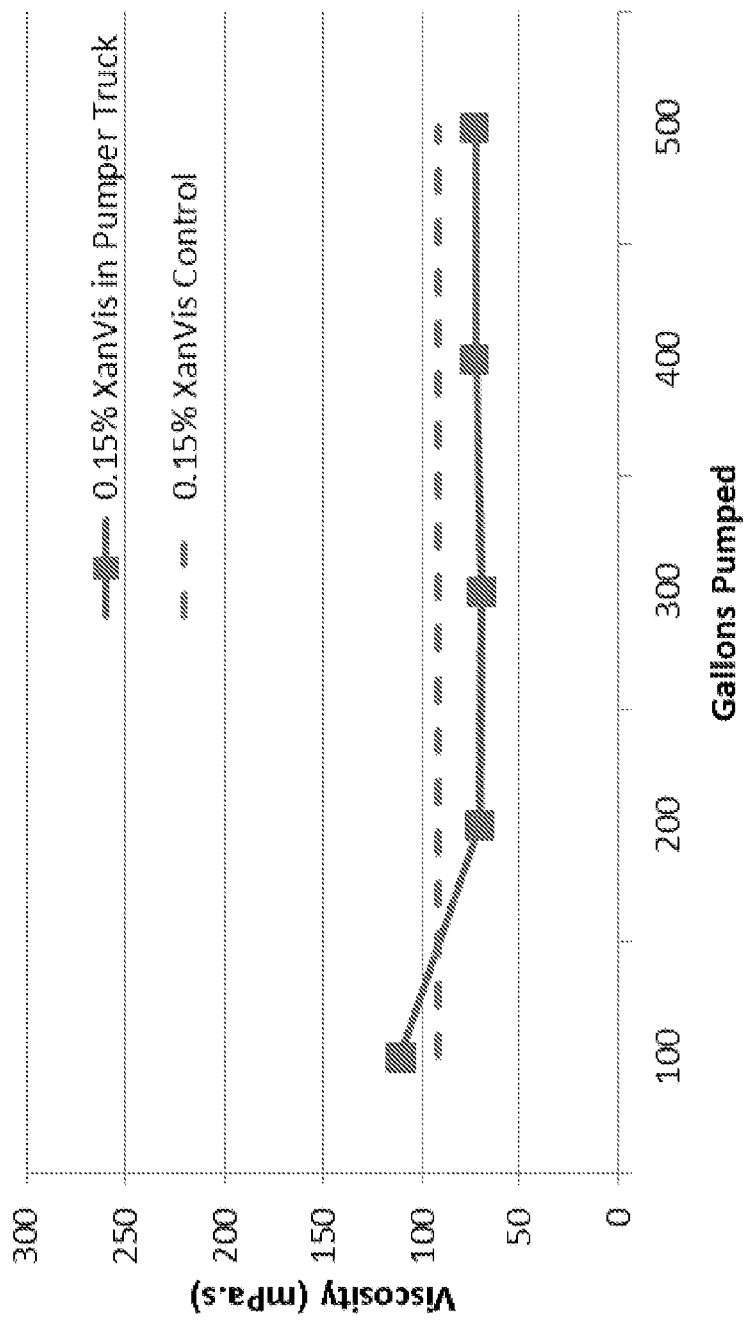
FIG. 7 illustrates the uniformity of a solution of the invention when prepared in a fire truck.

Example 4. Self-Hydration Polymer Testing (Viscosity)—Self-hydration of each polymer tested was determined by measuring the viscosity of a polymer solution over time. 2.0 g/L of XanVis was allowed to disperse in water without mixing. After approximately 60 minutes, the solution reached 254 Centipoise (mPa·s), the same viscosity as when mixed under high shear (254 mPa·s) as measured using a Brookfield viscometer, LV spindle number 2 at 30 RPM. A maximum, or peak, viscosity of 487 mPa·s was reached after 130 minutes and the solution viscosity gradually decreased to the high shear viscosity level over time (250 mPa·s). In a separate experiment, Keltrol T630 was added to water as a dry powder. Using a Brookfield viscometer, LV spindle number 1 at 60 RPM, the solution reached a viscosity of 3 mPa·s in three minutes without stirring. The solution was stirred and the viscosity reached a maximum of 3.4 mPa·s over the next nine minutes. The solution was stirred again and the viscosity reached 6 mPa·s after an additional 180 minutes. The solution was stirred again and the viscosity reached 28.5 mPa·s in 6 minutes. The results of the viscosity testing are summarized in Table 3. Maximum viscosity was determined by high shear mixing a separate solution having the same formulation. FIGS. 2 and 2a illustrate the viscosity of a solution of 2.0 g/L XanVis in water over time, without stirring. FIG. 3 illustrates the increase in viscosity of a solution of 0.7 g/L XanVis in water over time, without stirring. FIG. 4 illustrates the increase in viscosity of a solution of 0.7 g/L dry Keltrol T630 in water over time with the solution being stirred at 200 minutes. FIG. 5 illustrates the increase in viscosity of a solution of 0.7 g/L solvent slurry Keltrol T630 in water over time with the solution being stirred at 150 minutes. During the static hydration period (no mixing), only the self-hydrating xanthan solutions approached a final viscosity near or equal to the viscosity reached during a high shear stir of the same concentration of xanthan. The non-self-hydrating xanthan gums required extra mixing to reach the viscosity achieved during high shear mixing. After 2 hours of high shear mixing, the viscosity of the solution decreased by as much as 0.5 of the initial peak viscosity (FIGS. 2 and 2a). After a sufficient static hydration period, the viscosity of the unmixed xanthan solution peaks and then also decreases, slowly approaching the viscosity of the high shear mixed solution as the hydrated xanthan molecules separate. This phenomenon can explain the initial higher QDT of the 2 g/L XanVis solutions in Example 6 (Quarter Drainage FIG. 6).

TABLE 3

| Time (min) | XanVis (2.0 g/L) Viscosity (mPa · s) | Keltrol dry (0.7 g/L) Viscosity (mPa · s) | Keltrol slurry (0.7 g/L) Viscosity (mPa · s) | XanVis (0.7 g/L) Viscosity (mPa · s) |
|---|---|---|---|---|
| 0 | 0 | 3 | 2.5 | 2.3 |
| 1 | | | 3.1 | 2.8 |
| 2 | 12 | | | 3.1 |
| 3 | | 3 | 9.8 | 3.7 |
| 5 | | | 11.6 | 3.7 |
| 6 | | 3.4 | 13 | |
| 7 | 12 | | 14.3 | 3.8 |
| 8 | | 3.2 | | |
| 10 | | | | |
| 11 | | | 15.9 | 4.8 |
| 12 | | | 16.6 | |
| 13 | 14 | | | 6.3 |
| 14 | | | 16.8 | |
| 15 | | 3.3 | | 7.6 |
| 16 | 15 | | | |
| 17 | | 4.5 | | |
| 18 | 19 | | 18.0 | 10.5 |
| 19 | | | | 11.5 |
| 20 | | | | 13.0 |
| 21 | | 4.7 | 18.3 | 14.3 |
| 22 | 23 | | | 16.2 |
| 23 | | | 18.8 | |
| 25 | 26 | 4.8 | 18.8 | 20.2 |
| 27 | | | 19.7 | |
| 28 | | | 20.1 | |
| 29 | | | | 26.1 |
| 30 | 30 | 4.9 | 19.5 | |
| 31 | | | | 30.0 |
| 32 | | | | 31.9 |
| 34 | | | 19.7 | 35.7 |
| 35 | | 5 | | 37.5 |
| 36 | | | | 39.5 |
| 37 | | | 20.5 | 41.7 |
| 38 | | | | 43.3 |
| 40 | | | 20.5 | 47.2 |
| 43 | 130 | | 20.7 | 52.9 |
| 44 | | | 21.8 | 54.8 |
| 45 | | | | 56.6 |
| 46 | | | | 58.3 |
| 47 | | | | 60.2 |
| 48 | | | | 62.1 |
| 49 | | | | 63.9 |
| 50 | | 5.2 | | 65.5 |
| 51 | | | | 67.4 |
| 52 | | | | 69.0 |
| 54 | | | | 72.3 |
| 55 | 220 | | | |
| 56 | | | | 75.1 |
| 57 | | | | 76.6 |
| 58 | | | | 78.0 |
| 60 | | | | 80.8 |
| 61 | | | | 82.2 |
| 63 | | | | 84.4 |
| 66 | | | 25.0 | |
| 70 | 346 | | | 90.5 |

TABLE 3-continued

| Time (min) | XanVis (2.0 g/L) Viscosity (mPa·s) | Keltrol dry (0.7 g/L) Viscosity (mPa·s) | Keltrol slurry (0.7 g/L) Viscosity (mPa·s) | XanVis (0.7 g/L) Viscosity (mPa·s) |
|---|---|---|---|---|
| 71 | | | | 91.1 |
| 72 | | | | 91.6 |
| 73 | | | | 92.4 |
| 74 | | | | 92.7 |
| 75 | | 5.5 | | 93.3 |
| 76 | | | | 93.7 |
| 77 | | | | 94.1 |
| 78 | | | | 94.3 |
| 79 | | | | 94.6 |
| 80 | | | | 94.8 |
| 81 | | | | 95 |
| 84 | | | | 95.4 |
| 85 | 430 | | | |
| 93 | | | | 96.8 |
| 94 | | | | 96.9 |
| 97 | | | | 97 |
| 100 | 471 | | | 97.2 |
| 105 | | 5.7 | | 97.0 |
| 110 | | | | 96.5 |
| 111 | | | | 153 |
| 115 | 485 | | | 80.3 |
| 129 | | | 29.6 | |
| 130 | 487 | | | |
| 135 | | | 30.2 | |
| 140 | 483 | | | |
| 145 | 483 | | | |
| 150 | | | 30.4 | |
| 151 | | | 38.6 | |
| 156 | | | 39.0 | |
| 157 | | | 39.7 | |
| 160 | 473 | | 40.8 | |
| 165 | | | 41.1 | |
| 170 | | | 41.1 | |
| 175 | 467 | | | |
| 195 | | 6 | | |
| 198 | | 24 | | |
| 200 | 458 | | 25.4 | |
| 201 | | | 26.4 | |
| 202 | | | 27.5 | |
| 203 | | | 28.4 | |
| 204 | | | 28.5 | |
| 205 | | | 27.5 | |
| 207 | | | 28.6 | |
| 215 | 452 | | | |
| 230 | 444 | | | |
| 240 | | | 31.7 | |
| 241 | | | 32.5 | |
| 242 | | | 32.2 | |
| 243 | | | 32.5 | |
| 275 | 434 | | | |
| 335 | 417 | | | |
| 385 | | | 35.6 | |
| 400 | 400 | | | |
| 450 | 389 | | | |
| 540 | 376 | | | |
| 950* | 352 | | | |
| 1080 | 336 | | | |
| 1176 | 326 | | | |
| 1205 | 323 | | | |
| 1420 | 317 | | | |
| 1470 | 313 | | | |
| 1560 | 312 | | | |
| 3090* | 300 | | | |
| 3775 | 250 | | | |

*light stir at this time point

Figure 2B:
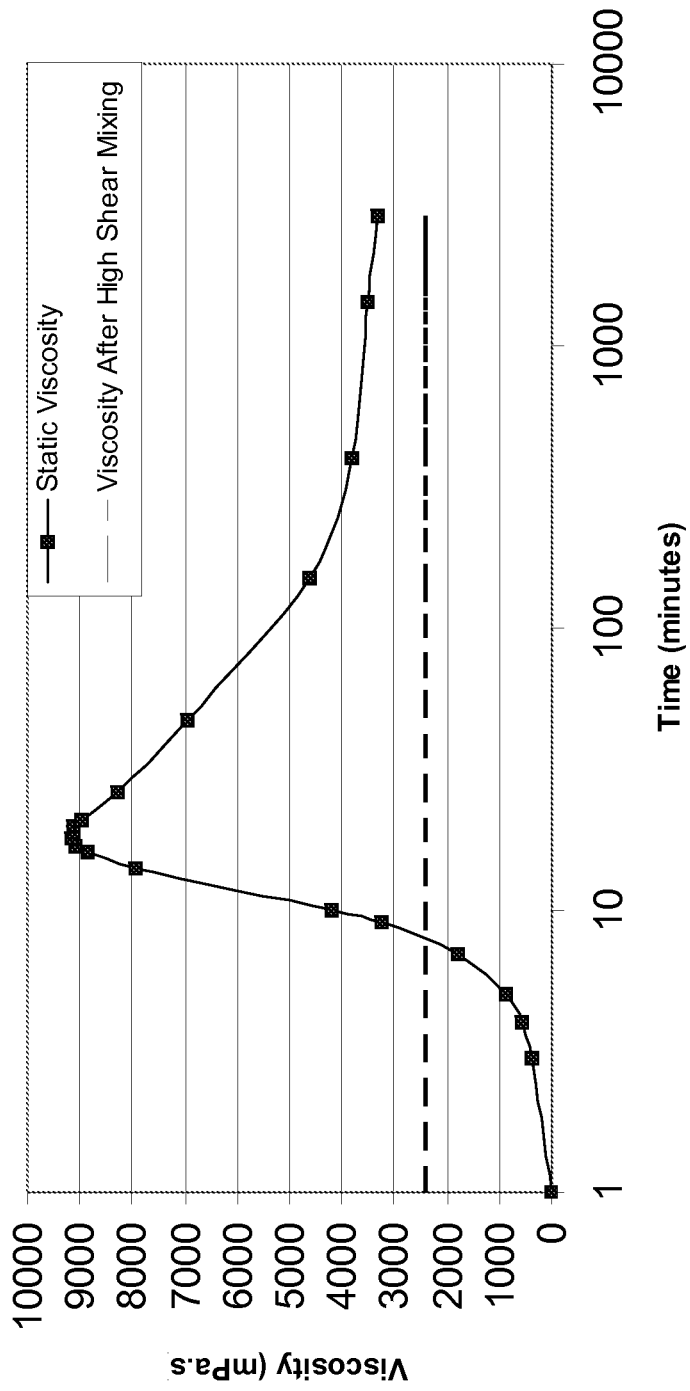

Example 5. Self-Hydration Polymer Testing (Viscosity)— A polymer concentrate solution was made that would equal 1.5 g/L of polymer once the surfactant solution was added. 6.0 g XanVis was mixed with 1.5 g DPM and allowed to disperse in 280 g of water with 80 g DPM without mixing. Viscosity was measured over time using a Brookfield viscometer, LV spindle number 4 at 60 RPM. A maximum, or peak, viscosity of 9160 mPa·s was reached after 18 minutes and the solution viscosity gradually decreased towards the high shear viscosity level over time. After 24 hours, the solution reached 3500 Centipoise (mPa·s), approaching the same viscosity (2500 mPa·s) as when mixed under high shear (see FIG. 2b).

Example 6. Foam Quality Tests— 20 grams of a self-hydrating xanthan gum (XanVis) and a non-self-hydrating xanthan gum (VanZan) were each mixed with 2.6 grams of dipropylene glycol methyl ether (DPM) and added to 10 L of water. 66.0 grams of 40% sodium decyl sulfate (Sulfotex 110) was added to the 10 L of polymer solution in a fire extinguisher body. The extinguisher was inverted twice to homogenize and the foam solution was shot through a 0.2 gpm air aspirated nozzle at 100 psi and collected off of a 45 degree angled backboard into a 1.5 L cylindrical collection pot with a valve at the base. The draining water was collected and the quarter drainage time was measured. The foam solution in the extinguisher was allowed to sit and the process was repeated periodically to determine the rate of static hydration over time. The results of the foam quality tests are summarized in Table 4 and illustrated in FIG. 6.

TABLE 4

| | 10 minutes | 20 minutes | 60 minutes | 4 hours | 9 hours |
|---|---|---|---|---|---|
| XanVis | | | | | |
| Expansion | 3.4 | 3.5 | | 3.6 | |
| Quarter Drain Time (minutes) | 18 | 122 | | 111 | |
| VanZan | | | | | |
| Expansion | 3.2 | 4.0 | 3.7 | | 3.9 |
| Quarter Drain Time (minutes) | 7.9 | 16.67 | 31.5 | | 50 |

Example 7. Fire Testing— The practical applicability of the claimed invention is shown through fire testing experiments. This invention produces effective, fluorine-free firefighting agents that match the performance of fluorine-rich AFFF and ARAFFF foams, and are able to utilize a host of environmentally benign surfactants. To use commercially available foam products, a firefighter must determine the physical property of the burning fuel and apply the appropriate AFFF or ARAFFF foam. A typical hydrocarbon surfactant choice in a firefighting formulation uses a surfactant molecule with between 6 and 10 carbon atoms. A surfactant package containing the longer chain length sodium lauryl sulfate (12 carbon atoms) or alpha olefin sulfonate (14-16 carbon atoms) would not normally be appropriate for use on hydrocarbon or polar solvent fires. The higher chain length carbon molecule allows more hydrocarbon vapors to be absorbed into the foam structure, causing not only foam breakdown but flashovers and shorter burnback times. The compositions and solutions of the invention can turn many unsuitable foamers into Class B AFFFs and ARAFFFs, giving firefighters the flexibility to use a multitude of foaming agents on many different fire situations.

Five different formulations of XanVis solutions ((1, 2, 3, 4 and 5) were tested. Formulation 1 had a polymer concentration of 1.2 g/L XanVis and a foamer concentration of 2.5 g/L (actives) sodium octyl sulfate (SOS) and Alpha olefin sulfonate (AOS) as a foamer. Formulation 2 had a polymer concentration of 2 g/L XanVis, with 2.4 g/L (actives) sodium laurel sulfate (SLS), 0.5 g/L (actives) cocoamidopropylbetaine (CAPB) and 0.3 g/L lauryl alcohol (LA) as a foamer. Formulation 3 was a solution containing a 3% dilution of Universal Gold, an ARAFFF foam concentrate commercially available from National Foam, and no additional polymer; it was created as a control. Formulation 4 contained a polymer concentration of 2 g/L XanVis and 2.6 g/L (actives) sodium decyl sulfate (SDS) as a foamer. Formulation 5 had a polymer concentration of 2 g/L XanVis and 10 g/L KnockDown as the foaming agent. KnockDown is a Class A foam concentrate commercially available from National Foam. Additionally, each polymer solution and the control solution was sprayed through an air aspirated nozzle at a flow rate of between 0.1 to 0.16 gallon per minute per square foot (gpm/sf) onto 4 gallons of burning fuel in a 2.69 sq ft pan. The percentage of the foam coverage was measured as a function of time. The time for each foam to extinguish the fire was also measured. After extinguishment, the foam was allowed to sit on the fuel for 10 minutes during which time a burning torch was applied twice over the foam blanket, once at 6 minutes after extinguishment and once at 9 minutes after extinguishment, to test whether the foam seals the hot edges from escaping fuel vapors. If a seal is formed there are no flashes or foam breakdown. A 4" diameter pipe was placed 2" from the wall where the fire was last extinguished and the foam is removed. The open fuel was lit and allowed to burn for 1:00 minute. The pipe was then removed. The foam blanket was then tested for burnback resistance. Burnback tests a foam's ability to contain a burning break in the foam blanket after the foam has aged. A successful burnback is achieved if no more than 20% of the pan area is burning after 5 minutes, or if the foam blanket self-extinguishes by sealing the burning area on its own. This indicates that the foam is fluid, stable and has no fuel vapor incorporated in the bubble structure. The results from the fire test experiments are tabulated in Table 5.

inverting the container and measuring the time for 25 mL to drain from the foam. Expansion ratios were measured by calculating the volume of foam generated and dividing by 100 mL of the portion of foam solution tested. Viscosity was measured by a Brookfield viscometer, LV spindle number 1 at 12 RPM. The polymer solution was exposed to ambient outdoor temperatures including freeze and thaw conditions. After 19 months, foam was formed from a mixture of the aged polymer solution and 10.0 g/L KockDown Class A by shaking 100 mL of the solution for 15 seconds in a graduated 2000 mL container, inverting the container and measuring the time for 25 mL to drain from the foam. Expansion ratios were measured by calculating the volume of foam generated and dividing by 100 mL of the portion of foam solution tested. Viscosity was measured by a Brookfield viscometer, LV spindle number 1 at 12 RPM. Results are tabulated in Table 6.

TABLE 6

|  | Expansion | QDT (minutes) | Viscosity (mPa · s) |
|---|---|---|---|
| Feb. 2010 | 6.0 | 64 | 348 |
| Sep. 2011 | 4.0 | 51 | 260 |

Example 9. Test for Uniformity of Solution in Fire Truck— A fire truck with a 500 gallon water tank was used to test the dispersibilty and uniformity of solution of a 0.15% solution of XanVis. A formulation containing 2.840 kg of XanVis, 0.946 kg DPM, 1.30 kg citric acid and 1.70 kg sodium bicarbonate was added to 500 gallons of water in the fire truck and was allowed to recirculate for five minutes.

TABLE 5

|  | Formulation | | | | | | |
|---|---|---|---|---|---|---|---|
|  | 1 | 2 | 2 | 3 | 4 | 5 | 5 |
| Polymer | 1.2 g/L | 2 g/L | 2 g/L | — | 2 g/L | 2 g/L | 2 g/L |
| Foamer | 2.5 g/L SOS/AOS | 2.4 g/L SLS/0.5 g/L CAPB/0.3 g/L LA | 2.4 g/L SLS/0.5 g/L CAPB/0.3 g/L LA | 30 g/L Universal Gold AR-AFFF | 2.6 g/L SDS | 10 g/L KnockDown Class A | 10 g/L KnockDown Class A |
| Fuel | Acetone | Heptane | Acetone | Acetone | IPA | IPA | Acetone |
| Flow Rate gal/min/ft sup 2 | 0.10 | 0.10 | 0.10 | 0.10 | 0.16 | 0.10 | 0.15 |
| Application | Type II | Type II | Type II | Type II | Type II | Type II | Type II |
| Fresh/Sea water | SW | F | F | F | F | SW | SW |
| Pre-Burn | 1:00 | 1:00 | 1:00 | 1:00 | 1:00 | 1:00 | 1:00 |
| 25% Coverage | 0:10 | 0:05 | 0:19 | 0:06 | 0:29 | 0:13 | 0:20 |
| 50% Coverage | 0:18 | 0:10 | 0:33 | 0:18 | 0:50 | 0:28 | 0:50 |
| 75% coverage | 0:33 | 0:15 | 0:41 | 0:31 | 1:05 | 0:48 | 1:44 |
| 90% Control | 0:46 | 0:20 | 0:49 | 0:46 | 1:26 | 1:30 | 1:58 |
| 98% Control | 1:20 | 0:25 | 1:23 | 0:58 | 1:56 | 1:55 | 2:12 |
| Extinguish | 1:47 | 0:57 | 1:50 | 1:22 | 3:13 | 2:33 | 2:33 |
| Application | 3:00 | 3:00 | 4:00 | 4:00 | 4:00 | 3:00 | 3:00 |
| Torch Test (6:00) | Seal | Seal | Seal | Seal | Seal | Seal | Seal |
| Torch Test (9:00) | Seal | Seal | Seal | Seal | Seal | Seal | Seal |
| Lit 4" Diameter Pipe | 14:00 | 14:00 | 14:00 | 14:00 | 14:00 | 14:00 | 14:00 |
| Removed Pipe | 15:00 | 15:00 | 15:00 | 15:00 | 15:00 | 15:00 | 15:00 |
| Burnback | Self exting. | Self exting. | Self exting. | Self exting. | Self exting. | Self exting. | Self exting. |

Example 8. Long Term Aging— Long-term aging tests showed that the polymer solution maintained similar performance characteristics after being stored over 18 months outdoors under freeze-thaw conditions with no biocide added. A solution of 1.8 g/L XanVis, 0.5 g/L DPM and 10.0 g/L KockDown Class A was prepared. A foam was formed from a portion of the solution by shaking 100 mL of the solution for 15 seconds in a graduated 2000 mL container, The polymer solution was then pumped via the fire truck's Hale 1500 gpm Single Stage Pump through a low expansion nozzle (Task Force Tips B-BGH Automatic 100 psi 10-125 gpm) at 60 gallons per minute while educting Silv-Ex Class A foam concentrate at 1% dilution. The resulting foam was captured in a 1000 ml graduated cylinder. The expansion ratio was measured by dividing the volume of foam contained in the cylinder and dividing by the weight of the foam contained. The Quarter Drain Time was determined measuring the time it took for ¼ of the volume of water contained in the foam to drain from the foam. Results are tabulated in Table 7. Samples of the polymer solution were taken every 100 gallons as the solution exited the nozzle. The viscosity of these samples was measured to determine the uniformity of the solution throughout the 500 gallon tank. A control solution of 0.15% XanVis was prepared and the viscosity measured to compare with the viscosities measured from the fire truck. Viscosity was measured by a Brookfield viscometer, LV spindle number 2 at 60 RPM. Results are tabulated in Table 8 and FIG. 8.

TABLE 8

| Gallons | Viscosity 0.15% XanVis in Pumper Truck (mPa · s) | Viscosity 0.15% XanVis (mPa · s) |
|---|---|---|
| 100 | 111 | 92 |
| 200 | 71 | 92 |
| 300 | 70 | 92 |
| 400 | 73 | 92 |
| 500 | 73 | 92 |

The sample of polymer solution that was taken at 200 gallons was also tested for expansion and Quarter Drain Time by shaking 100 mL of a solution containing the polymer solution and 11.6 g/L Sulfotex 110 for 15 seconds in a graduated 2000 mL container, inverting the container and measuring the time for 25 mL to drain from the foam. The expansion ratio was measured by calculating the volume of foam generated and dividing by 100 mL of the portion of foam solution tested. Results are tabulated in Table 7.

TABLE 7

| Foamer | Expansion | QDT |
|---|---|---|
| 1% Silv-Ex | 5.0 | >60 minutes |
| 11.6 g/L Sulfotex 110 | 13.0 | 70 minutes |

Example 10. Full Scale Fire Test— A full scale fire test was conducted using the same pumper truck and nozzle. A formulation containing 2.840 kg of XanVis, 0.946 kg DPM, 1.30 kg citric acid and 1.70 kg sodium bicarbonate was added to 500 gallons of water in the fire truck and was allowed to recirculate for ten minutes. The polymer solution was then pumped via the truck's Hale 1500 gpm Single Stage Pump through a low expansion nozzle (Task Force Tips B-BGH Automatic 100 psi 10-125 gpm) at 60 gallons per minute with Silv-Ex Class A foam concentrate at 1% dilution. The resulting foam was captured in a 1500 ml cylindrical container. The expansion ratio was measured by dividing the volume of foam contained in the cylinder and dividing by the weight of the foam contained. Due to time constraints of the long drain time, the Quarter Drain Time was determined after the fire test with a saved sample of the foam solution from the nozzle. The saved sample was tested for expansion and Quarter Drain Time four hours later by shaking 100 mL of the solution for 15 seconds in a graduated 2000 mL container, inverting the container and measuring the time for 25 mL to drain from the foam. The expansion ratio was measured by calculating the volume of foam generated and dividing by 100 mL of the portion of foam solution tested. The viscosity of this solution was measured by a Brookfield viscometer, LV spindle number 2 at 60 RPM. Results are tabulated in Table 9.

TABLE 9

| 0.15% XanVis/1% Silv-Ex Solution From Nozzle | Expansion | QDT | Viscosity (mPa · s) |
|---|---|---|---|
| Tested immediately on site | 4.8 | — | — |
| Tested saved sample | 4.0 | 2 hr 5 min | 75 |

Fifty five gallons of 99.9% Acetone was added to a 50 square-foot stainless steel pan. The fuel was lit and allowed to burn for a minimum of 1 minute. The 0.15% XanVis/1% Silv-Ex foam solution was applied to the fire by a Type III hand-held method using a low expansion nozzle (Task Force Tips B-BGH Automatic 100 psi 10-125 gpm) at 60 gallons per minute, pumped using the fire truck's Hale 1500 gpm Single Stage Pump. During application, foam was applied partially to the inside as well as outside of the pan to cool the sides; at the end of the test, the total amount of foam solution in the pan measured 60 gallons. Fifty percent coverage was achieved in 4 seconds. Ninety percent control was achieved in 27 seconds. Ninety eight percent control was achieved in 43 seconds. Extinguishment was achieved in 61 seconds. Foam was applied for an additional 2 minutes. After 60 minutes, the foam was stable and resistant to the acetone. The foam was fluid, cohesive and self-sealed when a one square foot section of the foam was removed. The burnback test could not be run due to equipment failure at the test facility. Results are tabulated in Table 10.

TABLE 10

| Polymer | 0.15% XanVis |
|---|---|
| Foamer | 1% Silv-Ex Class A |
| Flow Rate (gal/min) | 60 |
| Application | Type III |
| Fuel | Acetone |
| Fuel Temperature (° F.) | 51.4 |
| Fresh/Sea water | Fresh |
| 50% Coverage | 0:04 |
| 90% Control | 0:27 |
| 98% Control | 0:43 |
| Extinguishment | 1:01 |

Silv-Ex is a Class A foam that, by itself, would immediately dissolve in Acetone. When the Class A foam was used in conjunction with the present invention, a long-lasting alcohol-resistant foam was produced that extinguished a 3.8 million BTU polar solvent fire and remained stable in contact with the fuel for at least 60 minutes after application.

What is claimed:

1. A method of producing a foam composition comprising:
combining a non-aqueous polymer composition comprising a) about 75% to less than about 100% by weight of a surface treated water-soluble polymer, from greater than 0% to less than 25% by weight of a non-aqueous solvent based on the total weight of water-soluble polymer and non-aqueous solvent, wherein the water-soluble polymer is capable of self-hydrating and b) a dispersing agent comprising an acid and a carbonate, with water to form a polymer solution having a water-soluble polymer concentration of up to about 15 g/L, and subsequently, combining said polymer solution with foaming agents to produce a foam, wherein the polymer solution is formed without shear mixing.

2. The method of claim 1, wherein the polymer solution is capable of being stored for greater than one year wherein after such storage the polymer solution is capable of forming a foam upon addition of a foaming agent.

3. The method of claim 1, wherein the solution has a water-soluble polymer concentration of between about 1 g/L and about 4 g/L.

4. The method of claim 1, wherein the polymer composition comprises greater than about 80% by weight of the water-soluble polymer, and up to about 20% by weight of the non-aqueous solvent based on the total weight of water-soluble polymer and non-aqueous solvent.

5. The method of claim 1, wherein the polymer solution attains maximum viscosity within 60 minutes, without mixing.

6. The method of claim 1, wherein the foaming agents comprise one or more of solvents, surfactants, foam stabilizers, corrosion inhibitors, or biocides.

7. The method of claim 1, wherein the foaming agents are part of a commercially available concentrate comprising foaming agents or polymer and foaming agents.

8. The method of claim 1, wherein the foaming agents do not include fluorochemical surfactants.

9. The method of claim 1, wherein the polymer solution is streamed through a hose and the foaming agents are educted into the streaming polymer solution.

10. The method of claim 1, wherein the polymer solution and foaming agents are combined prior to being streamed through a hose.

11. The method of claim 1, wherein the polymer composition is provided in a water-soluble container.

12. The method of claim 11, wherein the water-soluble container is added to the water and dissolves to release said polymer into the water.

13. A method of extinguishing a fire comprising applying a foam produced according to the method of claim 1 to said fire.

14. A method of providing a biodegradable barrier over a landfill comprising applying a foam produced according to the method of claim 1 to said landfill.

15. A method of providing freeze protection to crops comprising applying a foam produced according to the method of claim 1 to said crops.

16. A method of providing a preventative barrier to protect against wildfires comprising applying a foam produced according to the method of claim 1 to the area sought to be protected.

17. The method of claim 1 wherein the water-soluble polymer is surface treated with glyoxal.

18. The method of claim 1 wherein the water-soluble polymer comprises greater than about 90% by weight and the non-aqueous solvent comprises from up to about 10% by weight based on the total weight of water-soluble polymer and non-aqueous solvent.

19. The method of claim 1, wherein the water-soluble polymer is a xanthan gum.

20. The method of claim 1, wherein the non-aqueous solvent is an alkylene glycol, polyalkylene glycol, alkylene or polyalkylene glycol mono ether, or combination thereof.

21. The method of claim 1, wherein the non-aqueous solvent is up to about 5% by weight based on the total weight of water-soluble polymer and non-aqueous solvent.

22. The method of claim 1, wherein the water soluble polymer is fully hydrated in the polymer solution prior to aeration.

23. The method of claim 1, wherein the mole ratio of acid to carbonate is 1:3.

24. The method of claim 19, wherein the non-aqueous solvent is an alkylene glycol, polyalkylene glycol, alkylene or polyalkylene glycol mono ether, or combination thereof.

* * * * *